United States Patent
Menon

(10) Patent No.: US 12,520,116 B2
(45) Date of Patent: Jan. 6, 2026

(54) WIRELESS EMERGENCY ALERT MESSAGE FAILURE NOTIFICATION AND TARGETED RETRY

(71) Applicant: AT&T Intellectual Property I, L.P., Atlanta, GA (US)

(72) Inventor: Sreejith Menon, Herndon, VA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 146 days.

(21) Appl. No.: 18/301,942

(22) Filed: Apr. 17, 2023

(65) Prior Publication Data

US 2023/0262440 A1    Aug. 17, 2023

Related U.S. Application Data

(63) Continuation of application No. 17/085,730, filed on Oct. 30, 2020, now Pat. No. 11,659,373.

(51) Int. Cl.
| | |
|---|---|
| *H04W 4/90* | (2018.01) |
| *H04W 4/06* | (2009.01) |
| *H04W 4/12* | (2009.01) |
| *H04W 84/04* | (2009.01) |

(52) U.S. Cl.
CPC .............. *H04W 4/90* (2018.02); *H04W 4/06* (2013.01); *H04W 4/12* (2013.01); *H04W 84/042* (2013.01)

(58) Field of Classification Search
CPC ........... H04W 4/90; H04W 4/12; H04W 4/06; H04W 84/042
See application file for complete search history.

(56) References Cited

U.S. PATENT DOCUMENTS

| | | | |
|---|---|---|---|
| 8,275,347 B2 | 9/2012 | Sennett et al. | |
| 2004/0212505 A1 | 10/2004 | Dewing et al. | |
| 2009/0131021 A1* | 5/2009 | Vogedes | H04W 4/02 455/422.1 |
| 2009/0227224 A1* | 9/2009 | Aftelak | H04M 11/04 455/404.2 |
| 2010/0029243 A1 | 2/2010 | Ozer et al. | |
| 2010/0124898 A1* | 5/2010 | Qu | H04W 4/14 455/466 |

(Continued)

OTHER PUBLICATIONS

Thomas Henze, "LTE proximity services", LTE World Summit 2014, Amsterdam RAI, (2014), pp. 1-28.

(Continued)

*Primary Examiner* — Congvan Tran

(57) ABSTRACT

A method, computer-readable medium, and apparatus for transmitting a unicast message comprising a message content of a wireless emergency alert message to an endpoint device that did not receive the wireless emergency alert message are disclosed. For example, a processing system of a cellular network including at least one processor may receive a request to broadcast a wireless emergency alert message, where the request comprises an alert area and a message content, broadcast the wireless emergency alert message in the alert area, where the wireless emergency alert message includes the message content, obtain a notification that a first endpoint device did not receive the wireless emergency alert message, and transmit a unicast message comprising the message content to the first endpoint device.

20 Claims, 5 Drawing Sheets

(56) References Cited

U.S. PATENT DOCUMENTS

| | | | |
|---|---|---|---|
| 2012/0295570 A1* | 11/2012 | Roin | H04L 67/52 |
| | | | 455/404.1 |
| 2013/0005354 A1 | 1/2013 | Sheilendra | |
| 2013/0157610 A1 | 6/2013 | Vainik et al. | |
| 2014/0050137 A1* | 2/2014 | Alberth, Jr. | H04W 4/06 |
| | | | 370/312 |
| 2014/0273910 A1 | 9/2014 | Ballantyne et al. | |
| 2016/0105729 A1 | 4/2016 | Stein | |
| 2017/0032402 A1* | 2/2017 | Patsiokas | G06Q 30/0207 |
| 2018/0159644 A1 | 6/2018 | Yang et al. | |
| 2018/0306929 A1 | 10/2018 | Park et al. | |
| 2018/0324571 A1* | 11/2018 | Buckley | H04L 67/565 |
| 2019/0253861 A1* | 8/2019 | Horelik | H04W 64/006 |
| 2019/0318604 A1 | 10/2019 | Stern et al. | |
| 2019/0327583 A1 | 10/2019 | Lee et al. | |
| 2020/0252988 A1 | 8/2020 | Wang et al. | |
| 2021/0410227 A1* | 12/2021 | Dizdarevic | H04W 12/12 |

OTHER PUBLICATIONS

Andy Seybold, "Public Safety Advocate: Waiting on Mission Critical Push-To-Talk (Data, Video)" | All Things FirstNet Apr. 25, 2019, pp. 1-13, https://allthingsfirstnet.com/public-safety-advocate-waiting-on-mission-critical-push-to-talk-data-video.

Sandra Wendelken, "Nascent Public-Safety LTE Proximity Services Market Faces Obstacles", Feb. 7, 2017, pp. 1-3, RadioResource Mission Critical Communications, https://www.rrmediagroup.com/Features/FeaturesDetails/Fld/723.

* cited by examiner

WIRELESS EMERGENCY ALERT MESSAGE FAILURE NOTIFICATION AND TARGETED RETRY

This application is a continuation of U.S. patent application Ser. No. 17/085,730, filed on Oct. 30, 2020, which is herein incorporated by reference in its entirety.

The present disclosure relates generally to methods, computer-readable media and apparatuses for transmitting a unicast message comprising a message content of a wireless emergency alert message to an endpoint device that did not receive the wireless emergency alert message, methods, computer-readable media and apparatuses for broadcasting a peer discovery message containing at least one information element indicating that a wireless emergency alert message is received, and methods, computer-readable media and apparatuses for determining from at least one information element of a peer discovery message that an endpoint device did not receive a wireless emergency alert message.

BACKGROUND

The Wireless Emergency Alert (WEA) system is capable of providing messages indicative of a variety of types of alerts. Via the WEA system, mobile devices can receive messages pertaining to weather conditions, disasters, child abduction America's Missing: Broadcast Emergency Response (AMBER) alerts, and any alerts for imminent threats to life or property issued by authorized government entities, for example. Due to broadcast capabilities, bandwidth constraints, and limitations of mobile devices (e.g., limited number of characters displayable on the mobile device), the size of the WEA message may be limited, e.g., to 90 characters. In addition, given that WEA messages are broadcast, there may be no mechanism in place to confirm delivery of a missed alert delivery. In several instances, it has been confirmed that mobile devices failed to receive a WEA message in an area where several other devices did receive the WEA message. For instance, this may become known when a non-receiving user interacts in-person with someone else nearby who did receive the WEA message. The lack of receipt of the WEA message may be due to the lack of proper network coverage, poor signal reception, a mobile device being set to airplane mode, or off, and so forth.

SUMMARY

In one example, the present disclosure describes a method, computer-readable medium, and apparatus for transmitting a unicast message comprising a message content of a wireless emergency alert message to an endpoint device that did not receive the wireless emergency alert message. For instance, a processing system of a cellular network including at least one processor may receive a request to broadcast a wireless emergency alert message, where the request comprises an alert area and a message content, broadcast the wireless emergency alert message in the alert area, where the wireless emergency alert message includes the message content, obtain a notification that a first endpoint device did not receive the wireless emergency alert message, and transmit a unicast message comprising the message content to the first endpoint device.

In another example, the present disclosure describes a method, computer-readable medium, and apparatus for broadcasting a peer discovery message containing at least one information element indicating that a wireless emergency alert message is received. For instance, a processing system including at least one processor of a first endpoint device may receive a wireless emergency alert message that is broadcast from a radio unit of a cellular network, and broadcast a peer discovery message containing at least one information element indicating that the wireless emergency alert message is received.

In another example, the present disclosure describes a method, computer-readable medium, and apparatus for determining from at least one information element of a peer discovery message that an endpoint device did not receive a wireless emergency alert message. For instance, a processing system including at least one processor of a first endpoint device may receive a peer discovery message from a second endpoint device containing at least one information element indicating that a wireless emergency alert message is received by the second endpoint device from a cellular network, where the wireless emergency alert message comprises a message content. The processing system may then determine, from the at least one information element, that the first endpoint device did not receive the wireless emergency alert message, transmit a notification to the cellular network that the first endpoint device did not receive the wireless emergency alert message, and obtain a unicast message from a radio unit of the cellular network, the unicast message comprising the message content.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
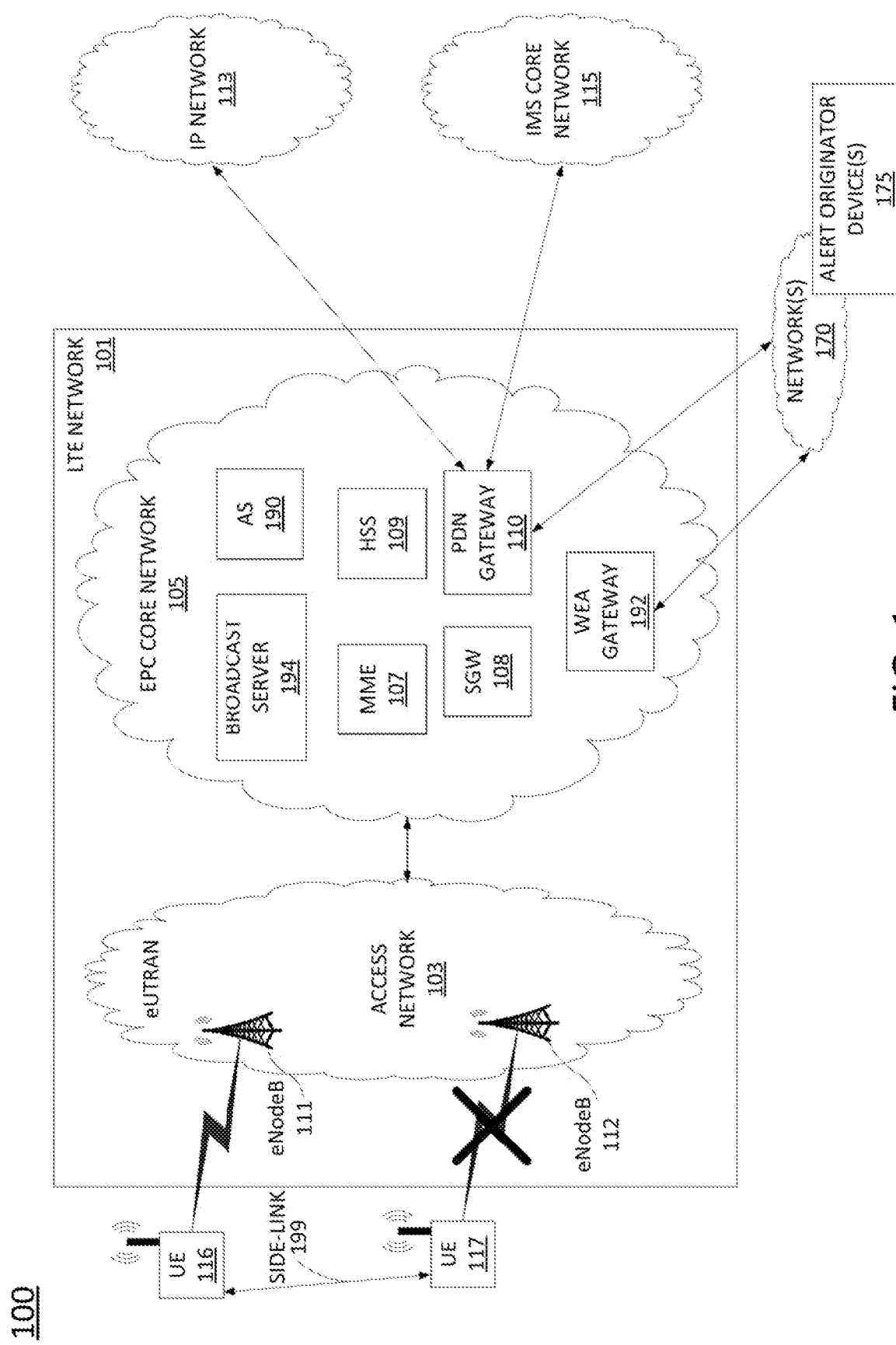
FIG. 1 illustrates an example system related to the present disclosure.

The present disclosure broadly discloses methods, computer-readable media and apparatuses for transmitting a unicast message comprising a message content of a wireless emergency alert message to an endpoint device that did not receive the wireless emergency alert message, methods, computer-readable media and apparatuses for broadcasting a peer discovery message containing at least one information element indicating that a wireless emergency alert message is received, and methods, computer-readable media and apparatuses for determining from at least one information element of a peer discovery message that an endpoint device did not receive a wireless emergency alert message. The Wireless Emergency Alert (WEA) system is a set of network components, protocols, and interfaces that enables authorities to send alerts to mobile devices of a cellular network in a designated alert area. WEA messages may pertain to such things as geophysical events, such as a landslide, meteorological events, such as windstorms, tornados, hurricanes, tsunamis, lightning storms, thunderstorms, hurricanes, freezing rain, blizzards, fog, etc., child abductions, chemical, biological, radiological, nuclear or explosive (CBRNE) threat or attack, or the like.

In general, an authorized alert originator, such as a governmental agency, is responsible for generating a request to broadcast a WEA message and submitting the request to a cellular network. The request may include a message content for the WEA message and a designation of an alert area. The request may also include a duration of time for which the alert is applicable and a designation of a category of the alert and/or a specific alert type. For instance, under Federal Communication Commission (FCC) guidelines a WEA message (other than a presidential alert) should include five information elements: an event type, an area affected, a recommended action, an expiration time (with time zone), and a sending agency. In addition, in one example, WEA messages may have a fixed designated size/length of 90 characters of alphanumeric text. For example, 90 characters have been designated as a standard WEA message size by the FCC. In one example, a request to broadcast a WEA message may include alternative or additional information for the message content, such as uniform resource locator (URL), or the like.

In one example, after receiving a request to broadcast a WEA message, a cellular network may then broadcast the WEA message via wireless broadcast transmissions from cell towers (e.g., from at least one radio unit of a cellular base station) covering the alert area, e.g., the "area affected" in alerting terminology. In one example, users do not subscribe to WEA messages. Instead, WEA message may be delivered to and received by all endpoint devices that are capable of receiving WEA messages within an alert area. In one example, the WEA messages are sent on dedicated broadcast channels to all endpoint devices in an alert area. In one example, a WEA message may be received by an endpoint device, but not presented to the user based upon a configuration of the endpoint device and the category or type of WEA message. For instance, a user may elect to not receive AMBER alerts at the user's endpoint device.

As noted above, in various instances, an endpoint device may fail to receive a WEA message. For instance, the WEA message may not be received due to lack of proper network coverage, poor signal reception, the endpoint device being set to airplane mode or being turned off, interference from other nearby sources, and so forth. However, WEA messages are critical in nature; hence a failure of delivery of such a critical message could be a matter of life and death. Examples of the present disclosure enable a cellular network operator to identify at least a portion of the endpoint devices that fail to receive a broadcast WEA message. Thus, the cellular network operator may generate more accurate measures regarding WEA message delivery, and may optimize/improve the cellular network infrastructure and configurations pertaining to WEA message delivery. In addition, the cellular network operator may utilize failed delivery alerts to trigger a targeted delivery of a WEA message content to one or more non-receiving endpoint devices via a unicast retry mechanism.

In one existing approach, a cellular network operator may use the bandwidth of the cellular network to extrapolate information as to how many endpoint devices could possibly be on the cellular network at a given point of time, and thereby how many endpoint devices could have failed to receive a WEA message. However, the probability of error in this calculation may be high. In contrast, the present disclosure provides additional data points to calculate the WEA message delivery failure rate and additionally provides a mechanism to selectively target the endpoint devices that may have missed a WEA message for unicast reattempts to deliver the WEA message content. These and other aspects of the present disclosure are described in greater detail below in connection with the discussion of FIGS. 1-5.

To better understand the present disclosure, FIG. 1 illustrates an example network, or system 100 suitable for implementing examples of the present disclosure for transmitting a unicast message comprising a message content of a wireless emergency alert message to an endpoint device that did not receive the wireless emergency alert message, for broadcasting a peer discovery message containing at least one information element indicating that a wireless emergency alert message is received, and for determining from at least one information element of a peer discovery message that an endpoint device did not receive a wireless emergency alert message. In one example, the system 100 comprises a Long Term Evolution (LTE) network 101, an IP network 113, and a core network, e.g., an IP Multimedia Subsystem (IMS) core network 115. In one example, system 100 is provided and operated by a cellular network operator. FIG. 1 also illustrates various endpoint devices, e.g., UEs 116 and 117, which may comprise LTE user equipment or user endpoints (UE) 116 and 117. UE 116 and 117 may each comprise a cellular telephone, a smartphone, a tablet computing device, a laptop computer, a pair of computing glasses, a wireless enabled wristwatch, or any other cellular-capable mobile telephony and computing device including computing components of connected vehicles, Internet of Things (IoT) sensor devices, and so forth (broadly, "endpoint devices").

In one example, the LTE network 101 comprises an access network 103 and a core network, e.g., an evolved packet core (EPC) network 105. In one example, the access network 103 comprises an evolved Universal Terrestrial Radio Access Network (eUTRAN). The eUTRANs are the air interfaces of the 3rd Generation Partnership Project (3GPP) LTE specifications for mobile networks. In one example, EPC network 105 provides various functions that support wireless services in the LTE environment. In one example, an EPC network is an Internet Protocol (IP) packet core network that supports both real-time and non-real-time service delivery across a LTE network, e.g., as specified by the 3GPP standards. In one example, all eNodeBs in the access network 103 are in communication with the EPC network 105. In operation, UE 116 may access wireless services via the eNodeB 111 and UE 117 may access wireless services via the eNodeB 112 located in the access network 103. It should be noted that any number of eNodeBs can be deployed in an eUTRAN. In one illustrative example, the access network 103 may comprise one or more eNodeBs.

In EPC network 105, network devices Mobility Management Entity (MME) 107 and Serving Gateway (SGW) 108 support various functions as part of the LTE network 101. For example, MME 107 is the control node for the LTE access-network. In one embodiment, it is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a public data network (PDN) gateway 110 which serves as a gateway that provides access between the EPC network 105 and various data networks, e.g., other IP networks 113, an IMS core network 115, and the like. The public data network gateway is also referred to as a PDN gateway, a PDN GW or a PGW.

The EPC network 105 may also include an application server (AS) 190. In one embodiment, AS 190 may comprise a computing device or processing system, such as computing system 500 depicted in FIG. 5, and may be configured to provide one or more functions for transmitting a unicast message comprising a message content of a wireless emergency alert message to an endpoint device that did not receive the wireless emergency alert message, and for performing various other operations in accordance with the present disclosure. Accordingly, the AS 190 may be connected directly or indirectly to any one or more network elements of EPC network 105, and of the system 100 in general, that are configured to gather and forward network analytic information, such as signaling and traffic data, and other information and statistics to AS 190 and to receive instructions from AS 190. In addition, AS 190 may be configured to receive requests to broadcast wireless emergency alert messages from alert originator devices 175 deployed in one or more alert originating networks 170, each of which may be associated with an authorized alert originator. For example, one or more of the alert originator devices 175 may comprise all or a portion of a Federal Emergency Management Administration (FEMA) Integrated Public Alert and Warning System (IPAWS).

In one example, AS 190 may also be configured to broadcast WEA messages to endpoint devices devices being served by wireless access networks in an alert area, such as endpoint devices/UEs 116 and 117. For example, AS 190 may confirm that a message content for the WEA message and other aspects of the request, such as the time duration, the alert area, and so forth, conform to various requirements and then provide the WEA message to a broadcast server 194. The broadcast server 194 may provide the WEA message to eNodeB 111, eNodeB 112, and/or other eNodeBs, or similar access network components to be broadcast to mobile devices that are being serviced by the cells of the alert area. In one example, a WEA message may be included in a system information block (SIB) that is broadcast by a radio unit of the cellular network (e.g., eNodeB 111 and/or eNodeB 112).

AS 190 may be further configured to perform other functions such as those described below in connection with the example methods of FIGS. 2-4. In various examples, AS 190 may alternatively or additionally be referred to as a cell broadcast center (CBC), an emergency alert server (EAS), or a WEA server. In one example, AS 190 may be deployed in a network operations center (NOC) of a cellular network operator, e.g., an entity operating the EPC network 105, LTE network 101, access network 103, and so on. Due to the relatively large number of connections available between AS 190 and other network elements, none of the actual links to the application server are shown in FIG. 1. Similarly, links between MME 107, SGW 108, broadcast server 194, eNodeBs 111 and 112, PDN gateway 110, and other components of system 100 are also omitted for clarity.

In accordance with the present disclosure, UEs 116 and 117 may be configured for and capable of device-to-device (D2D) communications, or peer-to-peer (P2P) communications, e.g., communications that are not forwarded/routed between endpoint devices via cellular network infrastructure, but which are conveyed directly between the endpoint devices over-the-air. In one example, UEs 116 and 117 may be configured to communicate in accordance with LTE-Direct, or LTE-D, also referred to as LTE Proximity-based Services (or ProSe). However, it should be noted that the present disclosure may similarly implement any future-developed standards, protocols, hardware, and so forth that may provide a cellular technology based side-link (e.g., "5G" proximity-based services, or the like). For instance, side-link 199 is illustrated in FIG. 1.

Figure 4:
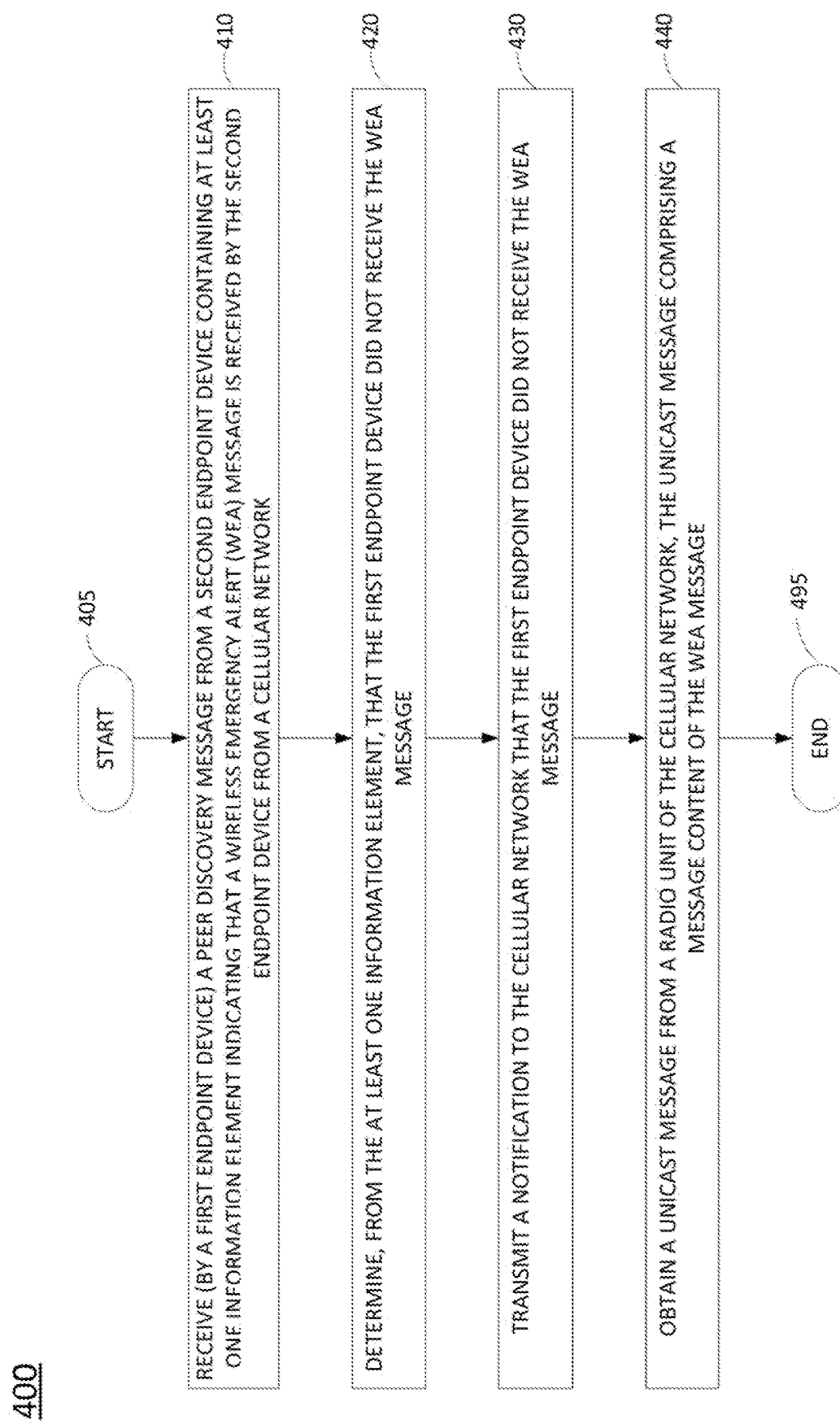
FIG. 4 illustrates a flowchart of an example method for determining from at least one information element of a peer discovery message that an endpoint device did not receive a wireless emergency alert message, according to the present disclosure.
Figure 5:
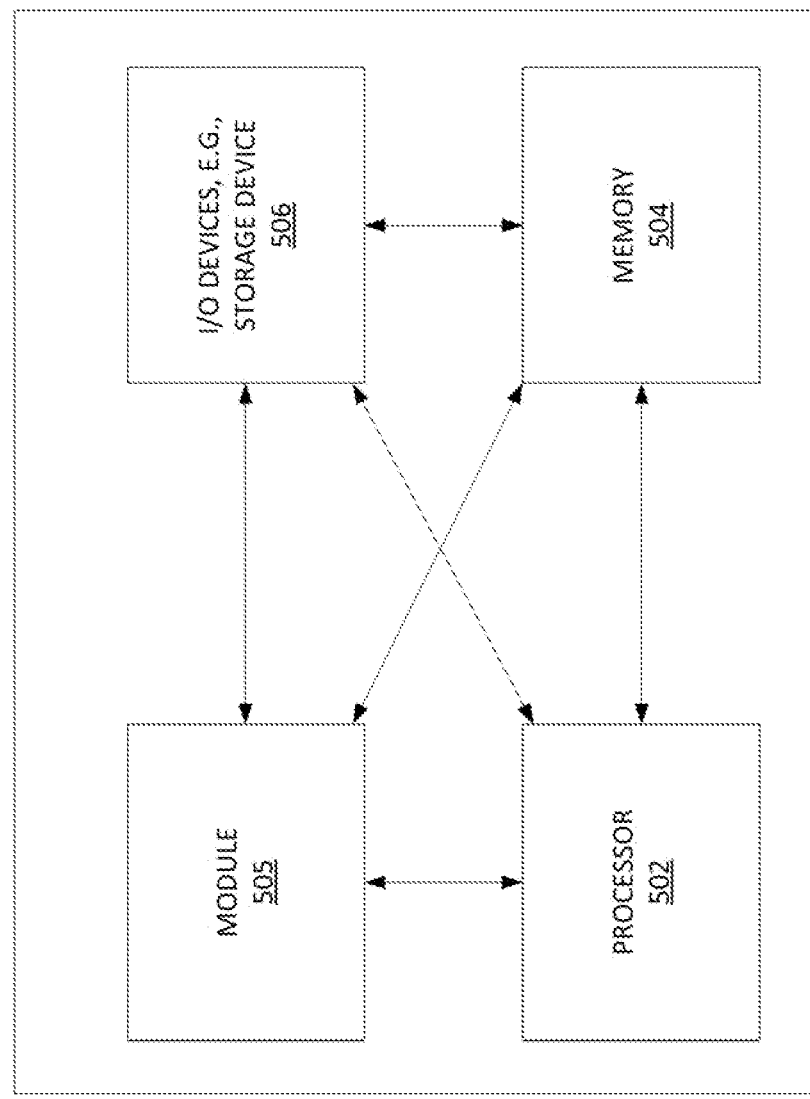
FIG. 5 illustrates a high-level block diagram of a computing device specially configured to perform the functions, methods, operations and algorithms described herein.

In addition, UEs 116 and 117 may each comprise a computing system, such as computing system 500 depicted in FIG. 5, and may be configured to provide one or more functions for broadcasting a peer discovery message containing at least one information element indicating that a wireless emergency alert message is received and/or for determining from at least one information element of a peer discovery message that an endpoint device did not receive a wireless emergency alert message, in accordance with the present disclosure. For example, UEs 116 and 117 may each or both be configured to perform one or more steps, functions, or operations in accordance with the example method 300 of FIG. 3 and/or the example method 400 of FIG. 4 described below.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

It should also be noted that examples of the present disclosure may also utilize non-cellular-based peer-to-peer communications, such as Wi-Fi direct, IEEE 802.15 based communications (e.g., "Bluetooth", "ZigBee", etc.), and so forth. Similarly, examples of the present disclosure may also utilize a side-link that is not peer-to-peer, but which is nevertheless external to the cellular network (e.g., external to LTE network 101). For instance, in another example, UEs 116 and 117 may be in communication via a router-managed Wi-Fi network, or wireless local area network (WLAN).

In accordance with the present disclosure, either of the UEs 116 or 117 that receives a broadcast WEA message (e.g., from one of the eNodeBs 111 or 112) may provide a notification that it has received a WEA message via device-to-device/peer-to-peer broadcast announcements. For instance, as noted above, it may be assumed that at least a percentage of the endpoint devices/UEs in an alert area may not receive a WEA message due to a variety of reasons. Nevertheless, some of the non-receiving endpoint devices may still be within range to receive a peer-to-peer/side-link announcement that indicates that a WEA message has been broadcast by the cellular network (and/or received by another endpoint device/UE that is sending the peer-to-peer/side-link communication). Thus, for example, UE 116 may receive a broadcast WEA message, but UE 117 may not. For instance, the connection between UE 117 and eNodeB 112 may fail (as indicated by the "X" in FIG. 1) at the time the WEA message is broadcast. However, UE 116, in response to receiving the WEA message broadcast via eNodeB 111, may then start broadcasting an announcement in accordance with a peer-to-peer/side-link communication protocol with an indication that a broadcast WEA message was sent (and/or received). In one example, UE 116 provides the indication by setting a designated information element (IE) in a side-link, device-to-device/peer-to-peer broadcast message. For example, the side-link broadcast messages may be in accordance with LTE ProSe, or LTE-D. For instance, the side-link broadcast messages may be "discovery" messages, e.g., P5_DISCOVERY messages that are sent via the P5 interface (for UE-to-UE peer discovery). For instance, side-link 199 may represent the P5 interface. In such an example, the information element may comprise a bit, string, or any other designated indicator that is assigned to represent whether a WEA message has been received with a designated time period, e.g., within the last 10 minutes, the last 30 minutes, the last hour, etc. For instance, a bit may be designated as a "WEA rx" bit, where a value of zero (0) represents that a WEA message has not been recently received, and a value of one (1) indicates that a WEA message has been recently received within the designated time period. In one example, UE 116 may be configured to transmit such a discovery message with a certain periodicity, such as every 10 seconds, every 30 seconds, etc.

Continuing with the present example, if UE 117 is currently enabled for receiving peer-to-peer/side-link communications and/or announcements (e.g., if UE 117 is ProSe enabled) and is within range to clearly receive the peer-to-peer/side-link broadcast from UE 116, then UE 117 may learn that it has not received the recent broadcast WEA message from the cellular network. For instance, UE 117 may inspect the designated information element of the discovery message and determine that the value indicates that UE 116 recently received a broadcast WEA message from the cellular network (e.g., from LTE network 101). For example, a "WEA rx" bit of the discovery message may be set to one (1). In one example, UE 117 may then send a notification to the LTE network 101 that it has not received the WEA message. For instance, UE 117 may be moved to a location with better cellular network coverage (such as moving from inside to outside, moving to a higher outdoor location, exiting from a parking garage or subway platform to street level, etc.), or a temporary interference condition may have passed. In one example, UE 117 may be configured to communicate with a designated entity within LTE network 101 in response to determining that it has not received a broadcast WEA message. For instance, AS 190 may additionally be tasked with receiving notifications from non-receiving UEs and for generating targeted unicast retries with the message content of the non-received broadcast WEA messages.

For instance, AS 190 may store the message contents, alert area information, and so forth regarding WEA messages that are broadcast via LTE network 101. Then, for any UEs that notify AS 190 of non-receipt of a WEA message, AS 190 may cause unicast messages to be transmitted to each non-receiving UE (e.g., each non-receiving UE that is within the alert area, and during a time period for which the WEA message remains valid, and so on). For example, UE 117 may attach via eNodeB 112 and notify AS 190 that UE 117 did not receive the WEA message. In response, AS 190 may cause a unicast message to be sent to UE 117 via eNodeB 112 with the message contents of the WEA message. A similar process may be repeated involving any other UEs in the alert area that may detect a peer-to-peer/side-link broadcast from UE 116 or another UE that has received the WEA message and that may also be transmitting a notification of WEA message receipt via peer-to-peer/side-link broadcast messages from the another UE. In one example, AS 190 may also instruct/command eNodeB 112 to reconfigure to increase the likelihood that UE 117 will receive the unicast message. For instance, AS 190 may request that eNodeB 112 increase the transmit power (e.g., beyond a current transmit power, or beyond a transmit power that would otherwise be selected in the absence of such instruction). Similarly, AS 190 may request that eNodeB 112 provide a directional beam in a direction of UE 117 and/or to utilize a narrower beamwidth than would otherwise be selected in the absence of such instruction. In this regard, in one example, the notification from UE 117 may further include location information, received signal strength or other beam selection metrics, and so forth which may be utilized by eNodeB 112 and/or AS 190 for beam steering.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, AS 190, broadcast server 194 and/or other network components may be deployed in IMS core network 115 instead of being deployed within the EPC network 105, or in other portions of system 100 that are not shown, while providing essentially the same functionality. In addition, access network 103 and/or EPC network 105 may include additional components that are omitted from illustration from FIG. 1, such as a ProSe function, a ProSe application server, etc. For instance, the ProSe function may comprise a computing system that provides service authorization for UE ProSe communications for various public safety UEs and non-public safety UEs, for public safety or non-public safety purposes. For example, the UEs and the ProSe function may communicate via a PC3 interface. In addition, the ProSe application server that may store user identifiers, may maintain UE permissions for ProSe services, and so on.

In still another example, system 100 may be configured such that communications between alert originator devices 175 and AS 190 may bypass PDN gateway 110, and other components. For instance, dedicated gateways and network connections that are not shared with other external entities may be provided for guaranteeing access by alert originators device 175 to AS 190. For example, a WEA gateway 192 may be included as a point of ingress to and egress from EPC network 105 for communications between alert originator devices 175 in WEA networks 170 and AS 190 in EPC network 105. Such a WEA gateway 192 may alternatively be referred to as a commercial mobile service provider (CMSP) gateway or a commercial mobile alert system (CMAS) gateway. In addition, various elements of access network 103 and EPC network 105 are omitted for clarity, including gateways or border elements providing connectivity between such networks.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., 2G network, 3G network, 5G network, and the like). Thus, these and other modifications are all contemplated within the scope of the present disclosure.

Figure 2:
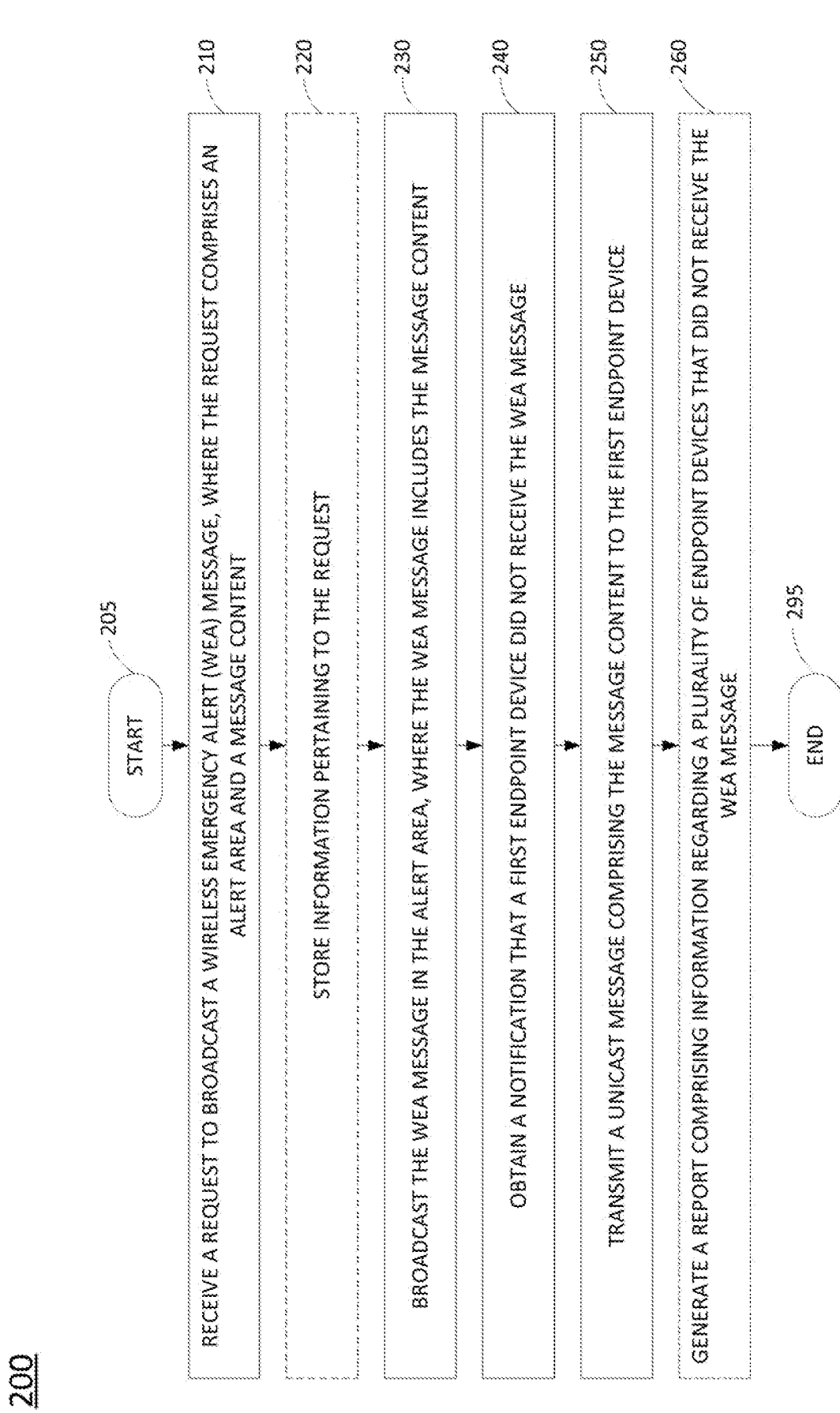
FIG. 2 illustrates a flowchart of an example method for transmitting a unicast message comprising a message content of a wireless emergency alert message to an endpoint device that did not receive the wireless emergency alert message, according to the present disclosure.

FIG. 2 illustrates a flowchart of an example method 200 for transmitting a unicast message comprising a message content of a wireless emergency alert message to an endpoint device that did not receive the wireless emergency alert message. In one example, the steps, operations or functions of the method 200 may be performed by any one or more of the components of the system 100 depicted in FIG. 1. For example, in one embodiment, the method 200 is performed by the application server (AS) 190 (e.g., a WEA server). In another example, the method 200 is performed by AS 190 in coordination with other components of the system 100, such as WEA gateway 192, broadcast server 194, eNodeBs 111 and 112, and so forth. Alternatively, or in addition, the steps, functions and/or operations of the method 200 may be performed by a processing system collectively comprising a plurality of devices as illustrated in FIG. 1 such as one or more of AS 190, WEA gateway 192, broadcast server 194, eNodeBs 111 and 112, and so forth. In one example, the steps, functions, or operations of method 200 may be performed by a computing device or processing system, such as computing system 500 and/or a hardware processor element 502 as described in connection with FIG. 5 below. For instance, the computing system 500 may represent at least a portion of a platform, a server, a system, and so forth, in accordance with the present disclosure. In one example, the steps, functions, or operations of method 200 may be performed by a processing system comprising a plurality of such computing devices as represented by the computing system 500. For illustrative purposes, the method 200 is described in greater detail below in connection with an example performed by a processing system.

The method 200 begins in step 205 and proceeds to step 210. In step 210, the processing system (e.g., of a cellular network) receives a request to broadcast a WEA message. In one example, the request comprises an area to which the WEA message pertains and a message content. In one example, the request may also include an alert type (e.g., a geophysical event alert, a meteorological event alert, an AMBER alert, a CBRNE alert, etc.). In one example, the message content may have a default format, e.g., a format that conforms to a standardized protocol and/or that provides a minimum guaranteed quantity of data. In one example, the request may comprise multiple data fields that may include: an event type, an area affected, a recommended action, an expiration time (with time zone), a sending agency, and so forth. In one example, the request may include the foregoing fields and comprise 90 characters of alphanumeric text for presentation on the mobile devices of recipients. In one example, the "message content" may comprise the information contained in all or a portion of this set of data fields. In one example, the request to broadcast the WEA message may also include message content that deviates from a default format, e.g., an excess of 90 characters, an image, audio, video, or other media file, a phone number to call for more information, a link to a network-based resource, and so on.

At optional step 220, the processing system may store information pertaining to the request, e.g., the message content, the alert area, the requesting agency, the alert duration/expiration time, and so forth.

At step 230, the processing system broadcasts the WEA message in the alert area, where the WEA includes the message content. In one example, at step 230 the WEA message is included in a system information block (SIB) that is broadcast by at least one radio unit of the cellular network. In one example, the broadcasting of the WEA message is accomplished via a broadcast server and one or more base stations, radio network controllers, and/or similar cellular network components in the alert area. In addition, the WEA message may be received by all endpoint devices (e.g., UEs) being serviced by such portions of the cellular network and that are currently capable of receiving broadcast WEA messages. However, a certain percentage of endpoint devices may fail to receive the broadcast WEA message due to a variety of reasons. For instance, in accordance with the method 200, at least a first endpoint device may fail to receive the broadcast WEA message.

However, as noted above, in one example, at least a second endpoint device in the alert area may be configured to broadcast a peer discovery message containing at least one information element comprising at least a first information element indicating that the WEA message is received (e.g., that the WEA message has been received by the second endpoint device). For instance, the second endpoint device may broadcast side-link, peer discovery messages with a "WEA rx" bit set for a defined duration of time in response to receiving the WEA message. In one example, the peer discovery message is in accordance with a wireless peer-to-peer communication protocol. For instance, the peer discovery message may be in accordance with a proximity-based services protocol (ProSe, LTE-Direct, or LTE-D). For example, the peer discovery message may comprise a PC5_DISCOVERY message (e.g., a ProSe direct discovery message). In one example, the at least the second endpoint device may comprise a public safety user equipment (PS-UE). In one example, the at least one information element further comprises a second information element indicating a time of receiving the WEA message (e.g., a timestamp). The at least one information element may also include an alert identifier (ID), e.g., an identifier to distinguish the WEA message from other WEA messages).

In one example, the first endpoint device is configured to receive the peer discovery message and is further configured to determine, from the at least one information element, that the first endpoint device did not receive the WEA message. For instance, the first endpoint device may inspect the information element that indicates that the second endpoint device that broadcast the peer discovery message received a WEA message within the defined duration of time. In one example, the first endpoint device is configured to determine that the first endpoint device did not receive the WEA message based upon the first information element and the second information element (e.g., when the first endpoint device determines that it did not receive the WEA message and the timestamp indicates the temporal validity). Similarly, the first endpoint device may also be configured to attempt to match an alert ID in the peer discovery message to any received WEA messages. For instance, there may be multiple WEA messages that are broadcast around the same time, and the first endpoint devices may receive at least one of the WEA messages but not another. The alert ID may therefore inform the first endpoint device that although it has received one WEA message, there is another WEA message that was missed.

At step 240, the processing system obtains notification that a first endpoint device did not receive the WEA message. For instance, the first endpoint device may be further configured to transmit the notification to the cellular network that the first endpoint device did not receive the WEA message. In one example, the notification is obtained directly from the first endpoint device (e.g., from the first endpoint device to cellular network infrastructure without passing via a peer relay). In another example, the first endpoint device may alternatively or additionally be configured to transmit the notification to the at least the second endpoint device, where the second endpoint device is configured to forward the notification to the cellular network. Thus, in one example, the notification that the first endpoint device did not receive the WEA message is obtained from at least the second endpoint device. In one example, the second endpoint device may be a PS-UE functioning as UE-to-network relay.

At step 250, the processing system transmits a unicast message comprising the message content to the first endpoint device. In one example, the unicast message comprises a short message service (SMS) message or a multimedia message service (MMS) message. In one example, step 250 may include increasing a transmit power of at least one radio unit of the cellular network that is utilized to transmit the unicast message to the first endpoint device (e.g., a base station that is serving the first endpoint device and/or to which the first endpoint device is currently attached). Alternatively, or in addition, in one example, step 250 may include transmitting via a directional beam in a direction of the first endpoint device from the at least one radio unit of the cellular network.

At optional step 260, the processing system generates a report comprising information regarding a plurality of endpoint devices that did not receive the WEA message, where the plurality of endpoint devices including the first endpoint device. For instance, the same or similar operations as described above may be repeated with respect to plurality of non-receiving endpoint devices. In one example, the information in the report may comprise the stored information regarding the WEA message, and for each of the plurality of endpoint devices: a device type, a device location at a time the WEA message was not received or when the device determined that it did not receive the WEA message, the primary serving cell identifier (ID), one or more secondary cell IDs (if any), the device status at the time of not receiving the alert (e.g., radio resource control (RRC) connected or not, airplane mode, or not, etc.), and so forth.

Following step 250 or optional step 260, the method 200 proceeds to step 295 where the method 200 ends.

Figure 3:
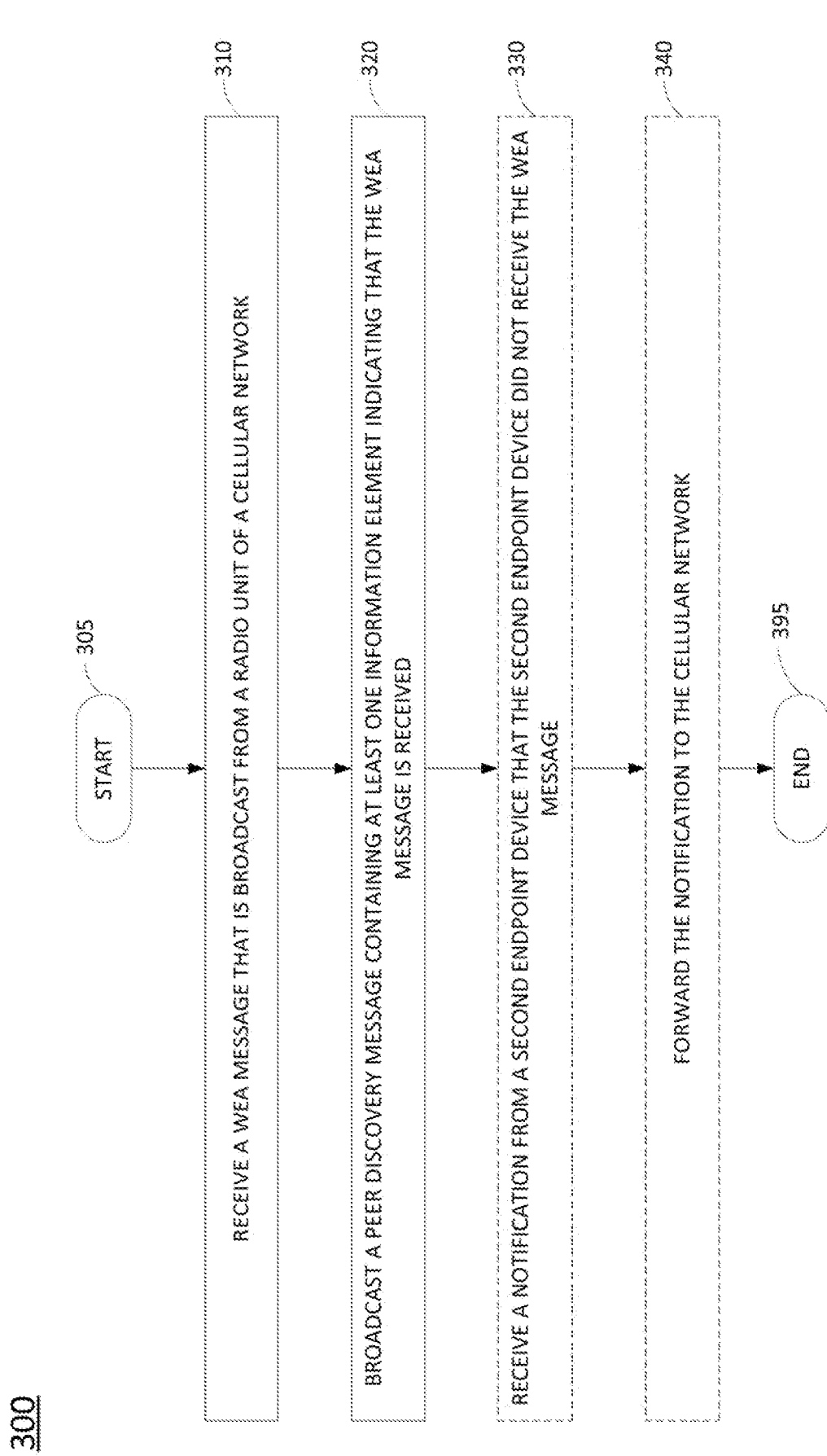
FIG. 3 illustrates a flowchart of an example method for broadcasting a peer discovery message containing at least one information element indicating that a wireless emergency alert message is received, according to the present disclosure.

FIG. 3 illustrates a flowchart of an example method 300 for broadcasting a peer discovery message containing at least one information element indicating that a wireless emergency alert message is received. In one example, the steps, operations or functions of the method 300 may be performed by any one or more of the components of the system 100 depicted in FIG. 1. For instance, in one example, the method 300 is performed by an endpoint device (e.g., one of UEs 116 or 117). In another example, the method 300 is performed by an endpoint device in coordination with other components of the system 100, such as WEA gateway 192, broadcast server 194, eNodeBs 111 and 112, and so forth. In one example, the steps, functions, or operations of method 300 may be performed by a computing device or processing system, such as computing system 500 and/or a hardware processor element 502 as described in connection with FIG. 5 below. For instance, the computing system 500 may represent at least a portion of an endpoint device, or UE, in accordance with the present disclosure. In one example, the steps, functions, or operations of method 300 may be performed by a processing system comprising a plurality of such computing devices as represented by the computing system 500. For illustrative purposes, the method 300 is described in greater detail below in connection with an example performed by a processing system.

The method 300 begins in step 305 and proceeds to step 310. In step 310, the processing system (e.g., of a first endpoint device) receives a WEA message that is broadcast from a radio unit of a cellular network. In one example, the WEA message is included in a system information block (SIB) that is broadcast by the radio unit of the cellular network. In one example, the WEA message includes a message content.

In step 320, the processing system broadcasts a peer discovery message containing at least one information element indicating that the WEA message is received. For instance, the processing system may broadcast side-link/peer discovery messages with a "WEA rx" bit set for a defined duration of time in response to receiving the WEA message. In one example, the peer discovery message is in accordance with a wireless peer-to-peer communication protocol. For instance, the peer discovery message may be in accordance with a proximity-based services protocol (ProSe, LTE-Direct, or LTE-D). For example, the peer discovery message may comprise a PC5_DISCOVERY message (e.g., a ProSe direct discovery message). In one example, the first endpoint device may comprise a public safety user equipment (PS-UE). In one example, the at least one information element further comprises a second information element indicating a time of receiving the WEA message (e.g., a timestamp). In addition, in one example, the at least one information element may also include an alert ID.

At optional step 330, the processing system may receive a notification from a second endpoint device that the second endpoint device did not receive the WEA message. In one example, the notification is in accordance with the peer-to-peer protocol and/or the proximity-based services protocol. For instance, the second endpoint device may be configured to receive the peer discovery message and may be further configured to determine, from the at least one information element, that the second endpoint device did not receive the WEA message. For instance, the second endpoint device may have recently been set to airplane mode, may have been underground or in an area with interference, and so forth, such that the second endpoint device may have failed to receive the WEA message at the time of broadcast by the cellular network in the alert area. In one example, the second endpoint device may be configured to determine that the second endpoint device did not receive the WEA message based upon the first information element and the second information element (e.g., when the WEA message is not received and the timestamp indicates the temporal validity). In one example, the second endpoint device may also be configured to determine that the second endpoint device did not receive the WEA message based upon an alert ID contained in the peer discovery message. In addition, the second endpoint device may be further configured to transmit the notification to the first endpoint device.

At optional step 340, the processing system forwards the notification to the cellular network. For instance, as noted above, in one example, the first endpoint device may comprise a PS-UE, e.g., operating as a UE-to-network relay. In one example, the notification may comprise a relay discovery additional information (RDAI) discovery message. In one example, both the first and second endpoint devices may comprise PS-UEs. It should be noted that once the cellular network is notified that the second endpoint device did not receive the broadcast WEA message, the cellular network may then target the second endpoint device with a unicast message containing the WEA message contents (and similarly for other non-receiving UEs).

Following step 320 or either of optional steps 330 or 340, the method 300 proceeds to step 395 where the method 300 ends.

FIG. 4 illustrates a flowchart of an example method 400 for determining from at least one information element of a peer discovery message that an endpoint device did not receive a wireless emergency alert message. In one example, the steps, operations or functions of the method 400 may be performed by any one or more of the components of the system 100 depicted in FIG. 1. For example, in one embodiment, the method 400 is performed by an endpoint device (e.g., one of UEs 116 or 117). In another example, the method 400 is performed by an endpoint device in coordination with other components of the system 100, such as WEA gateway 192, broadcast server 194, eNodeBs 111 and 112, and so forth. In one example, the steps, functions, or operations of method 400 may be performed by a computing device or processing system, such as computing system 500 and/or a hardware processor element 502 as described in connection with FIG. 5 below. For instance, the computing system 500 may represent at least a portion of an endpoint device, or UE, in accordance with the present disclosure. In one example, the steps, functions, or operations of method 400 may be performed by a processing system comprising a plurality of such computing devices as represented by the computing system 500. For illustrative purposes, the method 400 is described in greater detail below in connection with an example performed by a processing system.

The method 400 begins in step 405 and proceeds to step 410. In step 410, the processing system (e.g., of a first endpoint device) receives a peer discovery message from a second endpoint device containing at least one information element indicating that a WEA message is received by the second endpoint device from a cellular network. For instance, the cellular network may broadcast the WEA message comprising a message content. In addition, the second endpoint device may, in response to receiving the WEA message, broadcast side-link/peer discovery messages with a "WEA rx" bit set for a defined duration of time in response to receiving the WEA message. In one example, the peer discovery message is in accordance with a wireless peer-to-peer communication protocol. For instance, the peer discovery message may be in accordance with a peer-to-peer protocol and/or a proximity-based services protocol (ProSe, LTE-Direct, or LTE-D). For example, the peer discovery message may comprise a PC5_DISCOVERY message (e.g., a ProSe direct discovery message). In one example, the second endpoint device may comprise a public safety user equipment (PS-UE). In one example, the at least one information element further comprises a second information element indicating a time of receiving the WEA message (e.g., a timestamp). In addition, in one example, the at least one information element may also include an alert ID.

At step 420, the processing system determines, from the at least one information element, that the first endpoint device did not receive the WEA message (e.g., the first endpoint device has not recently received a WEA message, but the value of the information element indicates to the processing system that one was broadcast and received by at least the second endpoint device). In one example, step 420 comprises determining that the first endpoint device did not receive the wireless emergency alert message based upon the first information element and the second information element (e.g., when the WEA message is not received and the timestamp indicates the temporal validity). In one example, step 420 may also include determining that the first endpoint device did not receive the WEA message based upon an alert ID contained in the peer discovery message.

At step 430, the processing system transmits a notification to the cellular network that the first endpoint device did not receive the WEA message. In one example, the notification is transmitted directly to the cellular network (e.g., without passing via a peer relay). In another example, the notification may be transmitted to the second endpoint device, where the second endpoint device is configured to forward the notification to the cellular network. In one example, the notification is in accordance with the peer-to-peer protocol and/or proximity-based services protocol. For example, the second endpoint device may be a PS-UE functioning as UE-to-network relay. In one example, the notification may comprise a relay discovery additional information (RDAI) discovery message. In one example, both the first and second endpoint devices may comprise PS-UEs.

In one example, the notification includes information comprising at least one of: the device type of the first endpoint device, the location of the first endpoint device, the primary serving cell ID, one or more secondary cell IDs (if any), the device status at the time of not receiving the WEA message, and so forth. In one example, step 430 may include first establishing a connection to the cellular network, e.g., involving UE attach procedures via at least one base station/serving cell. In one example, the notification may be transmitted with an increased transmit power (e.g., above a current power level and/or above a power level that would otherwise be utilized in the absence of the present method 400). For instance, the first endpoint device may be on the edge of a cell sector and/or in another poor coverage area such that increasing the transmit power may increase the likelihood that the notification is cleanly received by the cellular network.

At step 440, the processing system obtains a unicast message from a radio unit of the cellular network, the unicast message comprising the message content of the previously missed WEA message. For instance, as noted above the unicast message may comprise an SMS message or MMS message. As noted above, in one example, a transmit power of at least one radio unit of the cellular network may be increased to transmit the unicast message to the first endpoint device. Similarly, at step 440 the processing system may increase a receive power at the first endpoint device (e.g., above a current power level and/or above a power level that would otherwise be utilized in the absence of the present method 400) to increase the likelihood of receiving the unicast message. Alternatively, or in addition, the unicast message may be received via a directional beam from the at least one radio unit of the cellular network.

Following step 440, the method 400 proceeds to step 495 where the method 400 ends.

In addition, although not specifically specified, one or more steps, functions or operations of the method 200, method 300, or method 400 may include a storing, displaying and/or outputting step as required for a particular application. In other words, any data, records, fields, and/or intermediate results discussed in the method 200, method 300, or method 400 can be stored, displayed, and/or outputted either on the device executing the respective method or to another device, as required for a particular application.

Furthermore, steps, blocks, functions, or operations in FIGS. 2-4 that recite a determining operation or involve a decision do not necessarily require that both branches of the determining operation be practiced. In other words, one of the branches of the determining operation can be deemed as an optional step. Moreover, steps, blocks, functions, or operations of the above described method 200, method 300, or method 400 can be combined, separated, omitted, and/or performed in a different order from that described above, without departing from the examples of the present disclosure.

FIG. 5 depicts a high-level block diagram of a computing system 500 (e.g., a computing device, or processing system) specifically programmed to perform the functions described herein. For example, any one or more components or devices illustrated in FIG. 1, or described in connection with the method 200 of FIG. 2, the method 300 of FIG. 3, or the method 400 of FIG. 4 may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where hardware processor element may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for transmitting a unicast message comprising a message content of a wireless emergency alert message to an endpoint device that did not receive the wireless emergency alert message, for broadcasting a peer discovery message containing at least one information element indicating that a wireless emergency alert message is received, and/or for determining from at least one information element of a peer discovery message that an endpoint device did not receive a wireless emergency alert message, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, it should be noted that the computing device may employ a plurality of hardware processor elements. Furthermore, although only one computing device is shown in FIG. 5, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 5 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for transmitting a unicast message comprising a message content of a wireless emergency alert message to an endpoint device that did not receive the wireless emergency alert message, for broadcasting a peer discovery message containing at least one information element indicating that a wireless emergency alert message is received, and/or for determining from at least one information element of a peer discovery message that an endpoint device did not receive a wireless emergency alert message (e.g., a software program comprising computer-executable instructions) can be loaded into memory 504 and executed by hardware processor element 502 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for transmitting a unicast message comprising a message content of a wireless emergency alert message to an endpoint device that did not receive the wireless emergency alert message, for broadcasting a peer discovery message containing at least one information element indicating that a wireless emergency alert message is received, and/or for determining from at least one information element of a peer discovery message that an endpoint device did not receive a wireless emergency alert message (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
receiving, by a first endpoint device including at least one processor, from a second endpoint device a peer discovery message containing at least one information element comprising a first information element indicating that a wireless emergency alert message was received by the second endpoint device via a cellular network;
determining, by the first endpoint device, from the first information element that the first endpoint device did not receive the wireless emergency alert message;
transmitting, by the first endpoint device, a notification to the cellular network that the first endpoint device did not receive the wireless emergency alert message; and
receiving, by the first endpoint device, a unicast message from the cellular network, wherein the unicast message comprises a message content of the wireless emergency alert message, and wherein the unicast message is received from at least one radio unit of the cellular network.

2. The method of claim 1, wherein the unicast message comprises a short message service message or a multimedia message service message.

3. The method of claim 1, wherein the wireless emergency alert message was included in a system information block that was broadcast by the at least one radio unit of the cellular network.

4. The method of claim 1, wherein the second endpoint device in an alert area is configured to broadcast the peer discovery message containing the at least one information element when the wireless emergency alert message is received by the second endpoint device.

5. The method of claim 4, wherein the second endpoint device comprises a public safety user equipment.

6. The method of claim 4, wherein the peer discovery message is in accordance with a wireless peer-to-peer communication protocol.

7. The method of claim 4, wherein the peer discovery message is in accordance with a proximity-based services protocol.

8. The method of claim 7, wherein the proximity-based services protocol comprises a ProSe protocol.

9. The method of claim 8, wherein the peer discovery message comprises a PC5_DISCOVERY message.

10. The method of claim 4, wherein the wireless emergency alert message is specific to the alert area.

11. The method of claim 1, wherein the at least one information element further comprises a second information element indicating a time that the second endpoint device received the wireless emergency alert message.

12. The method of claim 1, wherein the first endpoint device is further configured to transmit the notification to the at least one radio unit of the cellular network.

13. The method of claim 1, wherein the notification that the first endpoint device did not receive the wireless emergency alert message includes a location of the first endpoint device.

14. The method of claim 1, wherein the notification that the first endpoint device did not receive the wireless emergency alert message includes a device type of the first endpoint device.

15. The method of claim 1, wherein the notification that the first endpoint device did not receive the wireless emergency alert message includes a primary serving cell identification for the first endpoint device.

16. The method of claim 1, wherein the notification that the first endpoint device did not receive the wireless emergency alert message includes a device status of the first endpoint device at a time of not receiving the wireless emergency alert message.

17. The method of claim 1, wherein the first endpoint device is further configured to transmit the notification to the second endpoint device, and wherein the second endpoint device is configured to forward the notification to the cellular network.

18. A non-transitory computer-readable medium storing instructions which, when executed by a first endpoint device including at least one processor, cause the first endpoint device to perform operations, the operations comprising:
receiving from a second endpoint device a peer discovery message containing at least one information element comprising a first information element indicating that a wireless emergency alert message was received by the second endpoint device via a cellular network;
determining from the first information element that the first endpoint device did not receive the wireless emergency alert message;
transmitting a notification to the cellular network that the first endpoint device did not receive the wireless emergency alert message; and
receiving a unicast message from the cellular network, wherein the unicast message comprises a message content of the wireless emergency alert message, and wherein the unicast message is received from at least one radio unit of the cellular network.

19. A first endpoint device comprising:
a processing system including at least one processor; and
a non-transitory computer-readable medium storing instructions which, when executed by the processing system, cause the processing system to perform operations, the operations comprising:
receiving from a second endpoint device a peer discovery message containing at least one information element comprising a first information element indicating that a wireless emergency alert message was received by the second endpoint device via a cellular network;
determining from the first information element that the first endpoint device did not receive the wireless emergency alert message;
transmitting a notification to the cellular network that the first endpoint device did not receive the wireless emergency alert message; and
receiving a unicast message from the cellular network, wherein the unicast message comprises a message content of the wireless emergency alert message, and wherein the unicast message is received from at least one radio unit of the cellular network.

20. The first endpoint device of claim 19, wherein the unicast message comprises a short message service message or a multimedia message service message.

* * * * *